United States Patent [19]

Okano et al.

[11] Patent Number: 5,448,324
[45] Date of Patent: Sep. 5, 1995

[54] SHEET FILM PACK AND FILM PACK HOLDER

[75] Inventors: Takeshi Okano; Yoshibumi Udagawa; Yoichi Hamada, all of Hyogo, Japan

[73] Assignee: Fuji Photo Film Co., Ltd., Kanagawa, Japan

[21] Appl. No.: 74,634

[22] Filed: Jun. 10, 1993

[30] Foreign Application Priority Data

| Jun. 10, 1992 | [JP] | Japan | 4-150963 |
| Jun. 10, 1992 | [JP] | Japan | 4-150964 |
| Jun. 10, 1992 | [JP] | Japan | 4-150965 |
| Jun. 10, 1992 | [JP] | Japan | 4-150966 |

[51] Int. Cl.⁶ .................................. G03B 17/26
[52] U.S. Cl. ................... 354/277; 354/281; 354/282
[58] Field of Search ............. 354/174, 176, 178, 180, 354/181, 276, 275, 277, 182, 186, 281, 282

[56] References Cited

U.S. PATENT DOCUMENTS

| 652,174 | 6/1900 | Erkenswick . |
| 2,463,878 | 3/1949 | Johnson . |
| 3,021,772 | 2/1962 | Graham . |
| 4,181,418 | 1/1980 | Fechtner et al. . |
| 4,821,055 | 4/1989 | Loose et al. . |

FOREIGN PATENT DOCUMENTS

| 50-22029 | 3/1975 | Japan . |
| 4-234025 | 8/1992 | Japan . |

*Primary Examiner*—Monroe H. Hayes
*Attorney, Agent, or Firm*—Young & Thompson

[57] ABSTRACT

A sheet film pack has a pack housing for receiving a plurality of sheet film units, a lid for closing an opening of the pack housing, a film recovery mouth for recovering exposed sheet films, and a cap for closing the film recovery mouth and holding the lid in the close position. A film pack holder holds the sheet film pack in a sliding tray which is slidable in a holder housing. A cover having an exposure aperture is hinged to the holder housing and pivotally opened for loading the sheet film pack. When the cover is closed, the cap is released from the lid and the pack housing, and the cap is held in the holder housing. By sliding the lid out of and then back into the holder housing, the topmost sheet film unit is positioned in the exposure aperture and pressed by the lid into proper position. After photographing, by sliding lid out of and then back into the holder housing, the sliding tray is moved relative to the holder housing together with the lid, so that the exposed sheet film unit is fed into the bottom side of the pack housing through the film recovery mouth. A latch mechanism for preventing wrong motion of the lid and the sliding tray is incorporated in the film pack holder or in the pack housing. A counter disc is mounted in the sheet film pack, which can be coupled to a counter advancing mechanism mounted in the film pack holder, so as to advance the counter disc by one unit response to one reciprocating movement of the sliding tray.

19 Claims, 19 Drawing Sheets

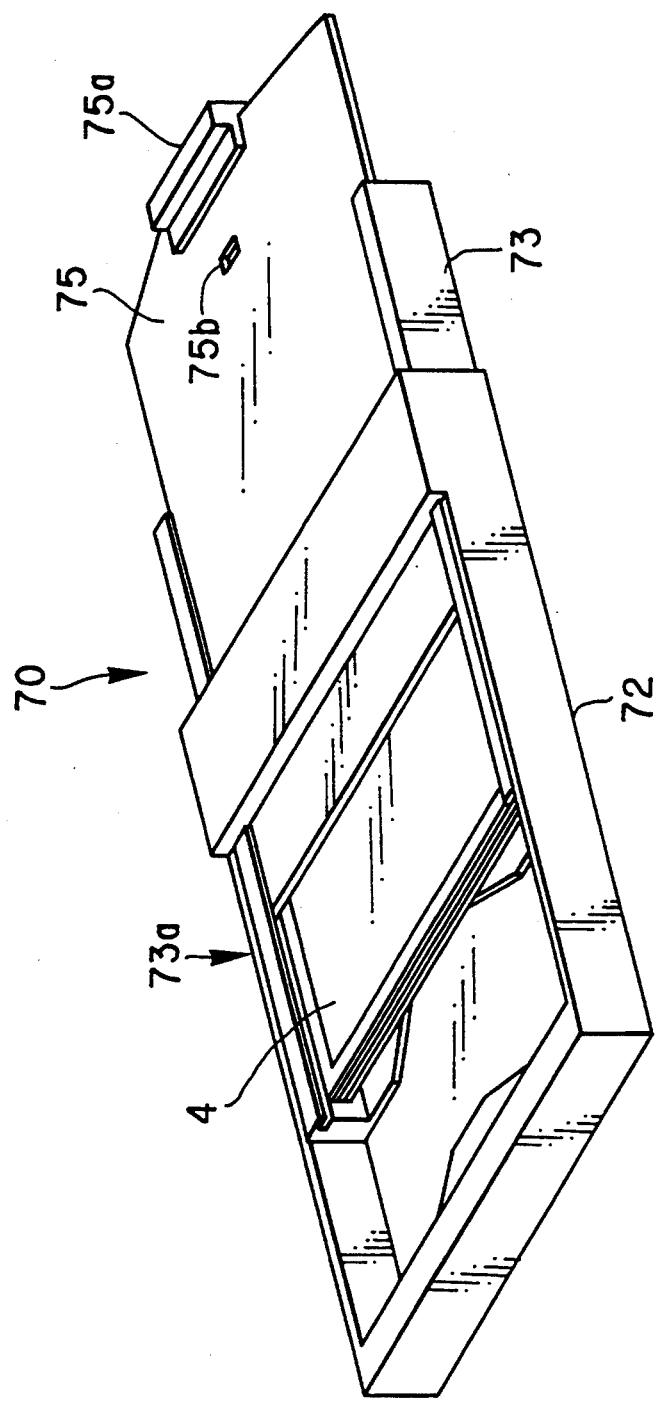

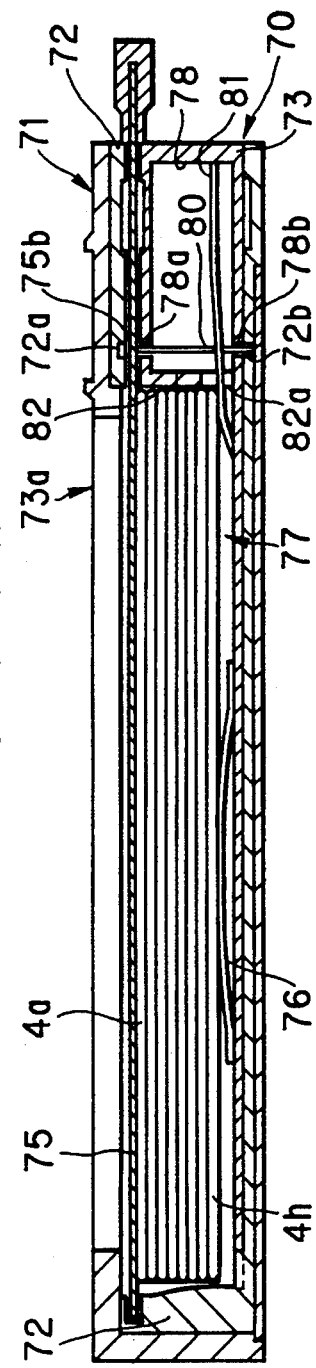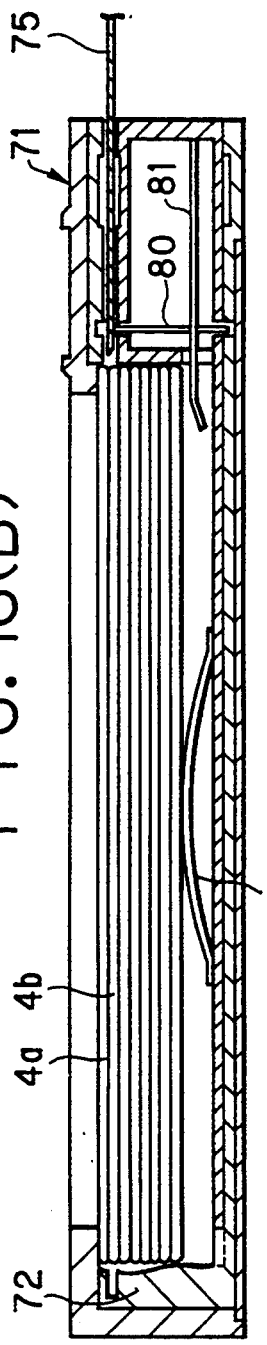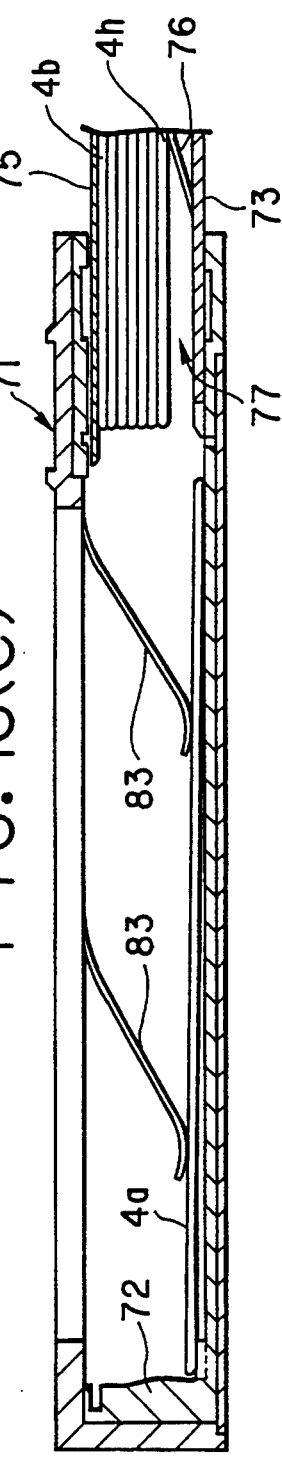

SHEET FILM PACK AND FILM PACK HOLDER

BACKGROUND OF THE INVENTION

1. Field of the Invention

The present invention relates to a sheet film pack containing therein a plurality of sheet films stacked one atop another, and a film pack holder for holding the sheet film pack such that the sheet films can be exposed in turn with a camera to which the pack holder is attached.

In particular, the present invention relates to a sheet film pack and a film pack holder wherein the sheet film pack is changeable without the need for removal of the film pack holder from the camera.

2. The Known Prior Art

Large format cameras, such as view cameras and studio cameras, are utilized for taking photographs that are to be printed in a large size or at a large print magnification. Such a photograph is used, for example, in a catalog. These large format cameras use a sheet film or a photographic plate 4×5 inches or more in size. Such a large format photographic medium is especially desirable in those cases which require sharpness of the image.

In some conventional large format cameras, the photographic plate or the sheet film is removed after each exposure from the camera, so as to load a new plate or film. This film loading system is inconvenient for taking photographs in rapid succession.

An improvement, a film holder is disclosed in U.S. Pat. No. 3,021,772 and Japanese Laid-Open Utility Model Appln. No. 50-22029, which is constituted of an external frame attachable to a camera and an internal frame mounted in the external frame. Such a film holder is also sold by Fuji Photo Film Co., Ltd. under the trademark "4×5 Quick Changer". The internal frame accommodates several sheet films stacked one atop another, and has an exposure opening for exposing the topmost of the stacked sheet films. A sliding lid is provided for closing the exposure opening in light-tight fashion. The internal frame is also slidable into and out of the external frame.

By alternately sliding the lid and the internal frame relative to the external frame, which is stationary because it is attached to the camera, the topmost sheet film is moved, after each exposure, into the bottom of the internal frame, and in turn, the next sheet film is placed on the top, that is, in the exposure position. Therefore, it is possible to expose successively several sheet films merely by sliding the lid and the internal frame, without the need for changing the film holder.

However, because the internal frame of the above-described film holder cannot be separated from the external frame, it is necessary to prepare a plurality of such film holders in order to take a larger number of photographs in succession than the number of sheet films available in each film holder. Accordingly, the known film holder is inconvenient for outdoor photography, especially in the mountains, because it is necessary to carry about the camera and the film holders. Also in studio photography, the known film holder is inconvenient to handle because it is necessary to detach the external frame of the film holder from the camera after all the available sheet films therein are exposed, and to attach another film holder to the camera in order to load unexposed sheet films.

To solve these problems, a system was developed and published in Japan on Aug. 21, 1992 as Japanese Laid-Open Patent Appln. No. 4-234025. This system is constituted by a film pack and a pack holder which correspond to the internal and external frames of the known film holder, respectively, but the film pack is removable from the pack holder. This system makes it possible to change and use a plurality of film packs in turn in combination with a single pack holder, and is therefore improved as to portability and ease of film loading.

The above-described system also requires the sliding of the film pack and a lid thereof in order to expose each sheet film. If the lid or the film pack is wrongly manipulated, the sheet film will be accidentally improperly exposed before or after the desired exposure. To avoid such a malfunction, the above-described known film holder is provided with a latch mechanism for preventing accidental sliding. As the internal frame cannot be removed from the external frame, the latch mechanism can be easily incorporated in the film holder. But the known latch mechanism must be manually actuated. Therefore, it is possible to forget to actuate the latch mechanism, thereby causing photographic fogging or double exposure.

The film pack of this known system has openings formed in one end of the film pack housing, for ejecting the exposed sheet films from the film pack housing and for receiving the same into the film pack housing. These openings are provided with respective light-trapping members.

However, if intense light, such as sunlight from a bright sky, falls directly onto the openings, the light may enter the interior of the film pack through the openings and produce photographic fog on the sheet films.

The film pack of this known system further has a film counting mechanism for counting and displaying the number of the exposed sheet films contained therein. Therefore, even if the film pack is changed before all the available sheet films have been exposed, the number of the exposed films in the respective film packs is displayed. However, the film counting mechanism increases the cost of manufacturing the film pack. For this reason, the film pack is relatively expensive, and the housing is used repeatedly. The user must remove the exposed sheet films from the film pack in a dark room or in a light-tight bag, and insert the exposed sheet films into a light-tight envelop or box, after which the exposed sheet films are forwarded to a photofinisher for development and printing.

Furthermore, when loading unexposed sheet films, the user must also insert the unexposed sheet films individually into thin film frames, hereinafter referred to as film sheaths, and thereafter set the sheet films inserted in the respective film sheaths, hereinafter referred to as sheet film units, in the film pack housing. This film loading operation must also be performed in a dark room. Accordingly, the film loading and unloading operations necessary with the known system are very cumbersome.

OBJECTS OF THE INVENTION

In view of the foregoing, an object of the present invention is to provide a pack holder which facilitates loading and unloading of a film pack containing a plurality of sheet film units therein, and which allows rapid successive exposure of a large number of sheet films.

Another object of the invention is to provide a reliable light-shielding member for the film pack.

Still another object of the invention is to provide an automatic latch mechanism which ensures unfailing sliding operation of a lid and a housing of the film pack.

A further object of the invention is to provide a device for displaying the number of exposed sheet films in the film pack at a low cost.

SUMMARY OF THE INVENTION

To achieve the above and other objects and advantages, according to the present invention, a sheet film pack has a pack housing for receiving a plurality of sheet film units, a lid for closing an opening of the pack housing, a film recovery mouth for recovering exposed sheet films, and a device for closing the film recovery mouth. According to a preferred embodiment, the mouth closing device is a cap removably attached to the pack housing and holding the lid in the close position.

The present invention also provides a film pack holder for holding the sheet film pack. The film pack holder has a sliding tray slidable in a holder housing. The sheet film pack is received in the sliding tray. A cover is hinged to the holder housing and is pivotally opened for loading the sheet film pack into the sliding tray. When the cover is closed, the cap is released from the lid and the pack housing, and the cap is held in the holder housing. By sliding the lid out of and then into the holder housing, the topmost sheet film unit is positioned in an exposure aperture formed in the cover, and pressed by the lid. After photography, by sliding lid out of and then into the holder housing again, the sliding tray is moved relative to the holder housing together with the lid, so that the exposed sheet film unit is moved to the bottom of the pack through the film recovery mouth.

Because the cap of the sheet film pack is separated from the pack housing merely in the film pack holder, the sheet film units contained in the sheet film pack are completely shielded from ambient light even when the sheet film pack is outside the film pack holder. Besides, as the sliding tray of the film pack holder for receiving the sheet film pack is slidable relative to the holder housing, it is possible to use a plurality of sheet film packs in turn in combination with a single film pack holder without the need for removal of the film pack holder from the camera.

Furthermore, because the exposure station is defined by the exposure aperture formed in the film pack holder, it is unnecessary to form an exposure aperture in each individual sheet film pack. This contributes to reducing the cost of the sheet film pack.

Automatic latch mechanism for preventing improper movement of the lid and the sliding tray is incorporated in the film pack holder or in the pack housing. Because the latch mechanism is actuated merely by sliding the lid, the sheet film units will not be accidentally exposed to ambient light.

According to another preferred embodiment, a counter disc is mounted in the sheet film pack, which can be coupled to a counter advancing mechanism mounted in the film pack holder, so as to advance the counter disc by one unit in response to one reciprocating movement of the sliding tray. Because the complicated counter advancing mechanism is mounted in the film pack holder, and the sheet film pack merely has the counter disc, the cost of the sheet film pack can be lowered. As the number of the exposed sheet films is displayed in the sheet film pack, it is possible to exchange the sheet film packs before all available sheet films have been exposed.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein:

FIG. 15 is a perspective view of a film pack according to another embodiment of the invention;

FIG. 16A to 16C are sectional views illustrating a latch mechanism according to another embodiment of the invention, in various operative positions;

DETAILED DESCRIPTION OF THE PREFERRED EMBODIMENT

Figure 1:
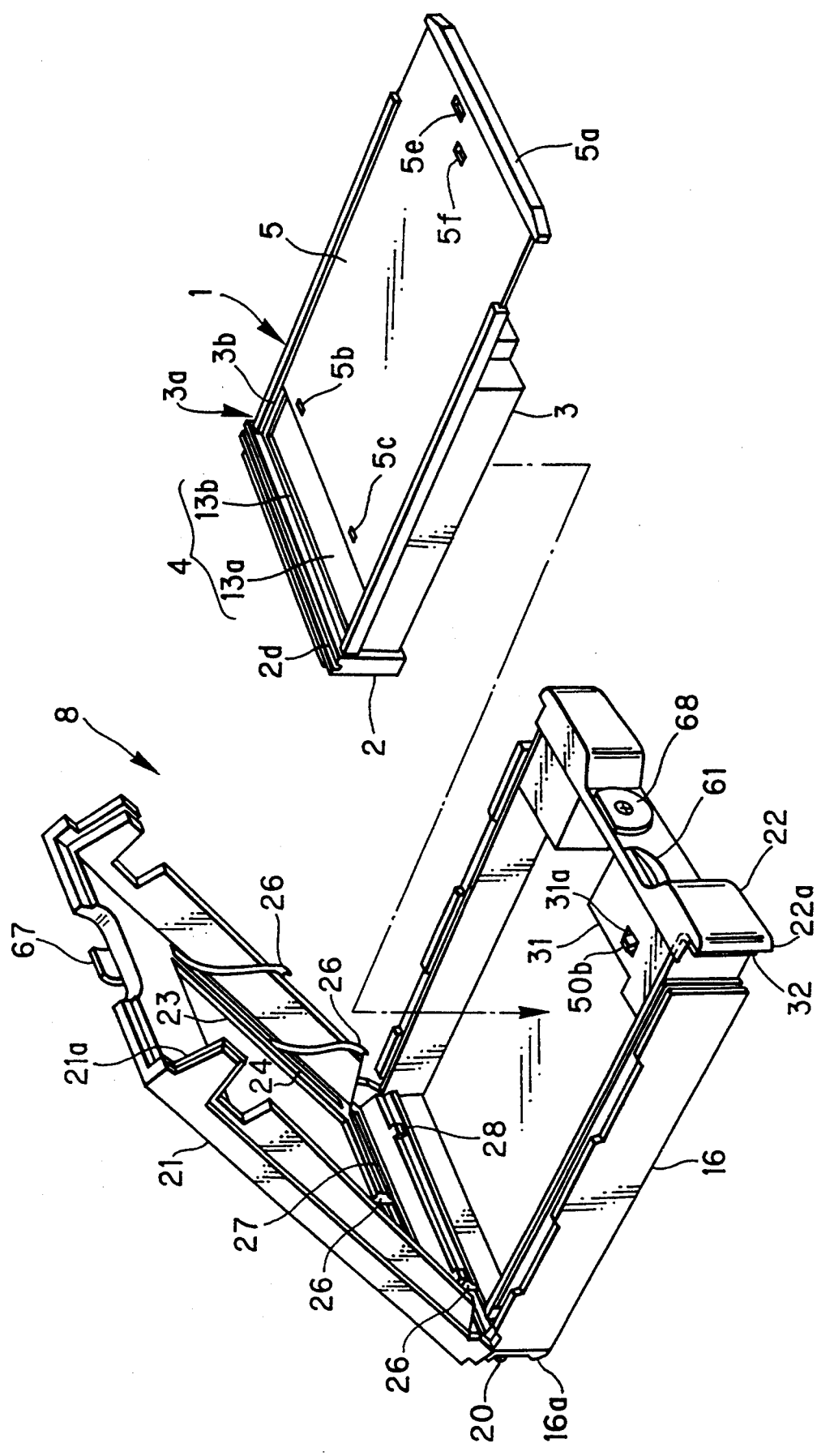
FIG. 1 is an exploded perspective view of a film pack and a pack holder for holding the film pack according to an embodiment of the invention.
Figure 2:
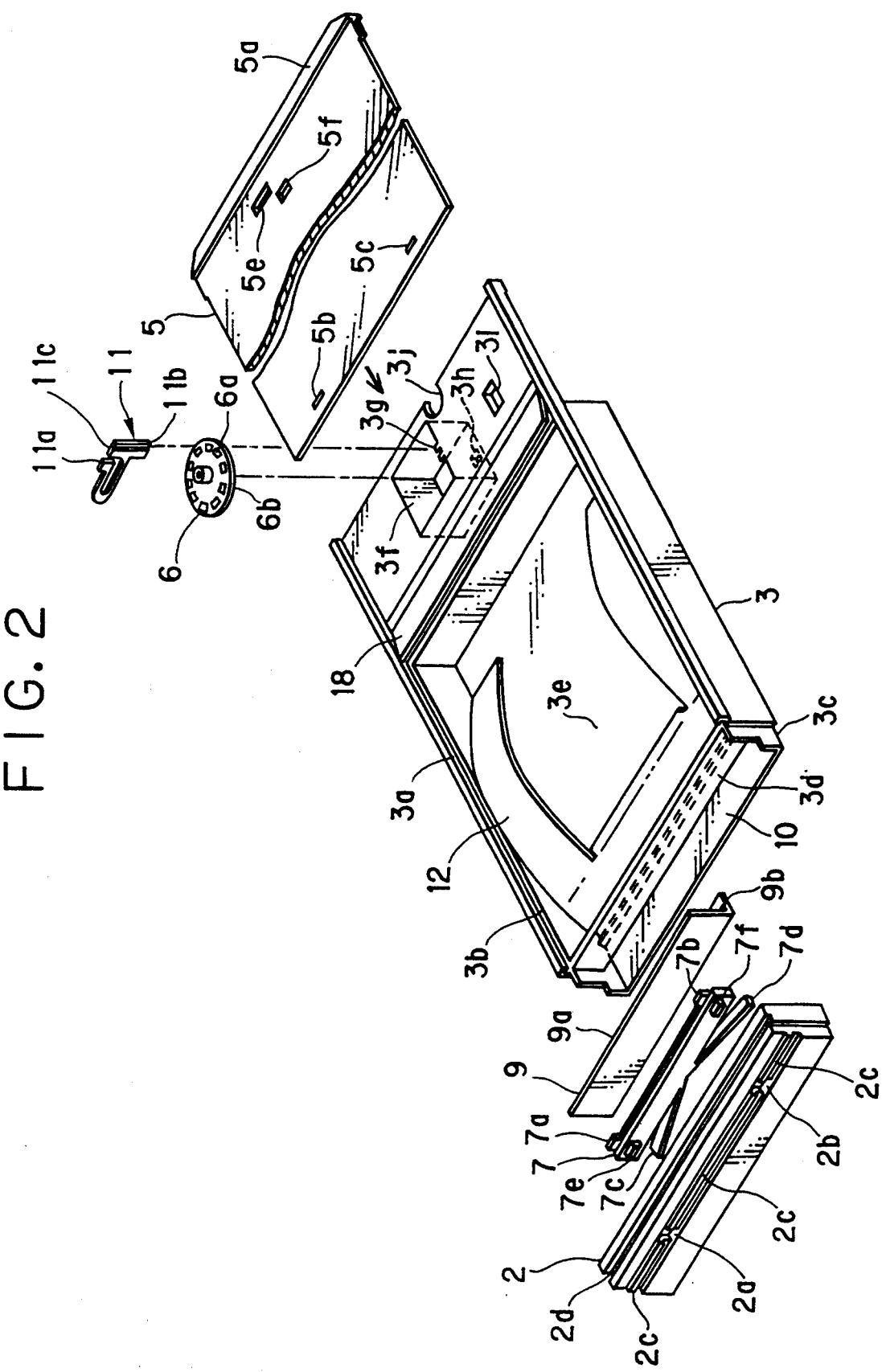
FIG. 2 is an exploded perspective view of the film pack excluding the sheet film unit.

In an embodiment shown in FIGS. 1 to 14, a film pack 1 is comprised of a pack housing 3 having a cap 2 removably attached to a trailing end of the pack housing 3, a plurality of sheet film units 4 stacked in the pack housing 3, and a sliding lid 5 for opening and closing an opening 3a formed on the front, i.e., the top side in FIG. 1, of the pack housing 3. The sliding lid 5 has a grip 5a on one end thereof that corresponds to a leading end of the pack housing 3 in the closed position. The lid 5 can be slid by hand in grooves 3b which are formed inside the longitudinal side walls of the pack housing 3, so as to pull out the lid 5 or push the same into the film pack 1. The sliding lid 5 is larger in size than the sheet film units 4. The film pack 1 further has a counter disc 6 for displaying the number of exposed sheet film units 4. The counter disc 6 is disposed in the pack housing 3 proximate the leading end thereof, as shown in FIG. 2.

The cap 2 has a fastening member 7 incorporated therein. The fastening member 7 has a pair of claws 7a and 7b on the top edge thereof. The claws 7a and 7b are brought into engagement in holes 5b and 5c formed in the trailing end of the lid 5 to fasten the lid 5 to the cap 2. The fastening member 7 also has two resilient legs 7c and 7d on the bottom thereof, which urge the fastening member 7 upward, i.e., toward the lid 5. The fastening member 7 further has a pair of projections 7e and 7f which protrude perpendicularly to the claws 7a and 7b to the outside of the cap 2 through the holes 2a and 2b. The height of the holes 2a and 2b is sufficiently larger than that of the projections 7e and 7f to allow the relative vertical movement of the fastening member 7. The ends of the projections 7e and 7f in the holes 2a and 2b are aligned with ends of ridges 2c formed on either side of the holes 2a and 2b. Thereby, the projections 7e and 7f are prevented from being accidentally pushed.

As will be described in detail later, when the film pack 1 is loaded in a pack holder 8, the projections 7e and 7f are pushed downward by a corresponding pair of projections formed on the pack holder 8. As a result, the claws 7a and 7b are disengaged from the holes 5b and 5c of the lid 5.

The cap 2 further includes an L-shaped plate 9. A wall portion 9a of the plate 9 encloses the fastening member 7 in the cap 2, and a bottom flange 9b of the plate 9 receives the trailing end of the exposed one of the sheet film units 4 that is ejected from the pack housing 3. Gaps are provided around the plate 9 relative to the external walls of the cap 2, for allowing the trailing end of the lid 5 to have access to the fastening member 7 inside the cap 2, and for allowing a channel-shaped trailing end portion 3c of the pack housing 3 to fit in the cap 2.

A separating wall 3d is disposed inside the trailing end portion 3c, for aligning the trailing ends of the sheet film units 4 in the pack housing 3. A spacing 10 between the bottom edge of the separating wall 3d and an inner bottom surface 3e of the pack housing 3 is formed as a recovery mouth for receiving the exposed sheet film unit 4 back into the pack housing.

Figure 3:
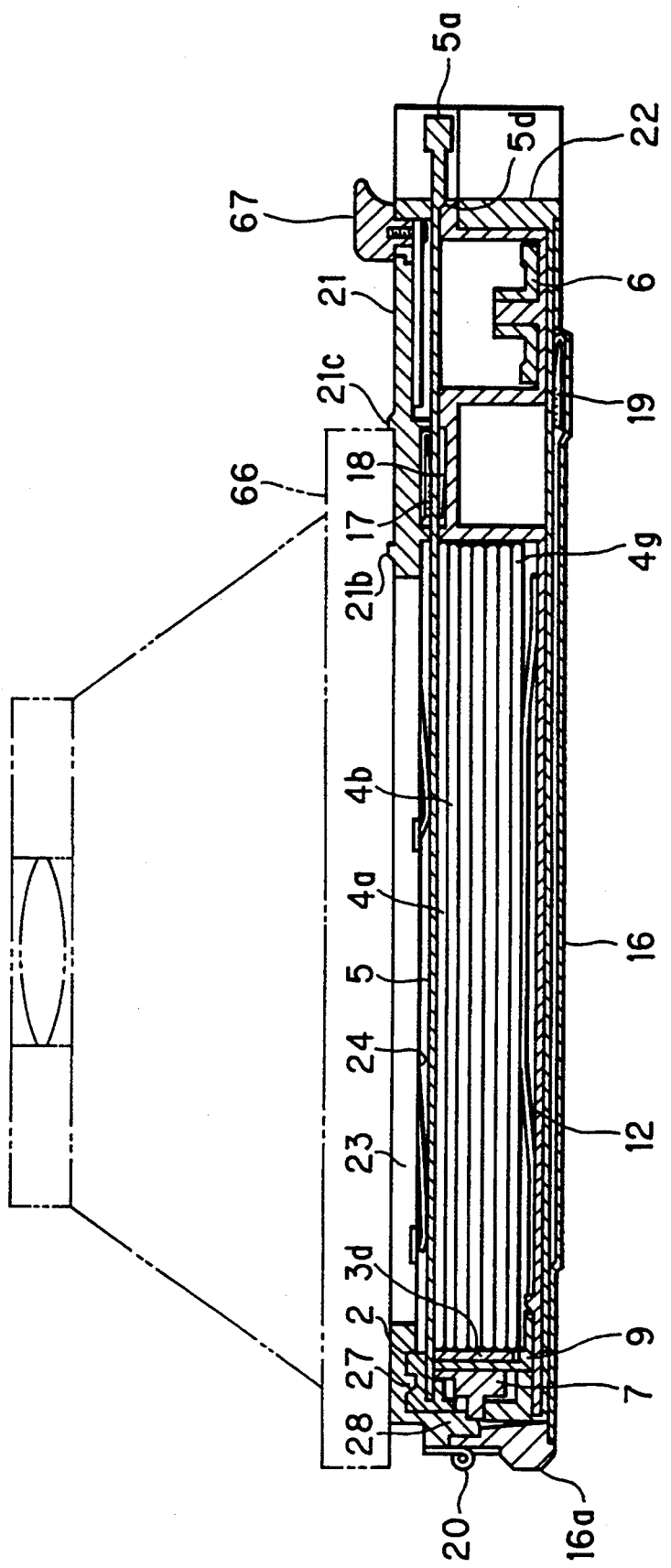
FIG. 3 is a sectional view of the film pack and the pack holder in an initial operative position wherein the film pack is disposed in the pack holder attached to an exposure frame of a camera.
Figure 5:
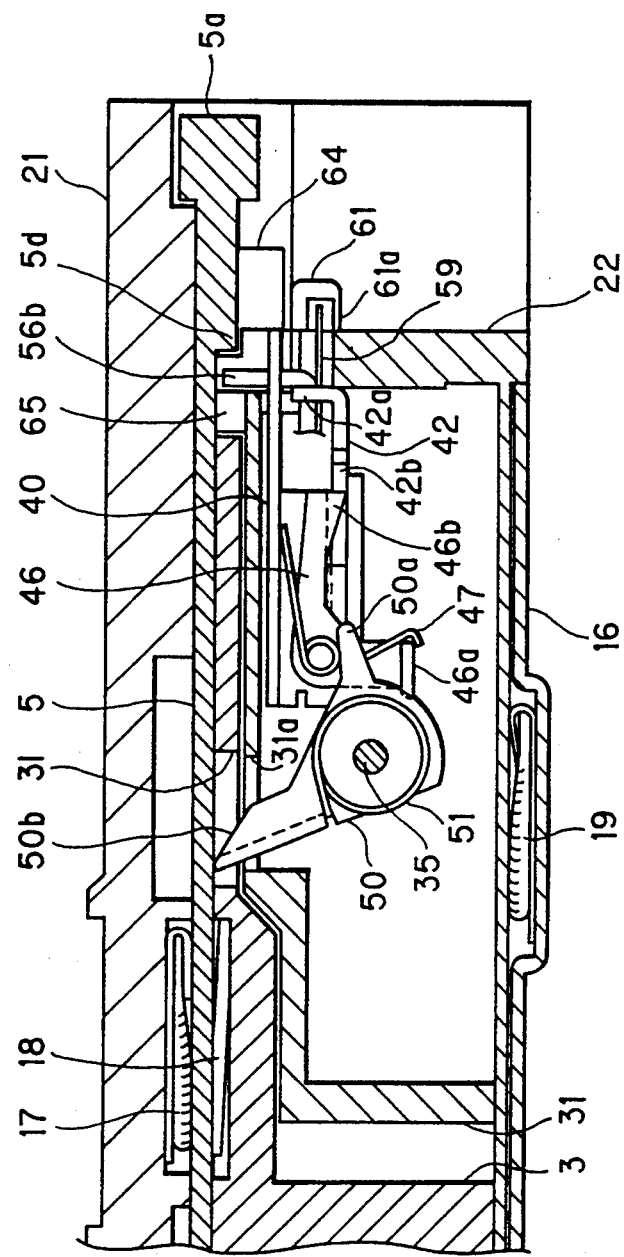
FIG. 5 is a side view in partial cross-section of the latch mechanism shown in FIG. 4, in the initial position.

The sliding lid 5 has a stepped portion 5d formed on its underside in the vicinity of the grip 5a, as shown in FIGS. 3 and 5. The stepped portion 5d strikes the leading end of the pack housing 3, thereby preventing the lid 5 from moving farther toward the cap 2. Therefore, when the trailing end of the lid 5 is fastened to the cap 2 by the fastening member 7, the cap 2 cannot slip out of the pack housing 3.

The counter disk 6 is rotatably disposed in a rectangular cavity 3f of the pack housing 3, and is pressed downward by a pressing member 11 having a spring arm. The pressing member 11 is guided along a groove 3g formed in the chamber 3f. Because one end 11a of the spring arm of the pressing member 11 is constrained by the inner surface of the lid 5, a lower end 11b of the pressing member 11 always contacts one of a plurality of claws 6a formed circumferentially on the counter disc 6, so as to prevent reversal of the disc rotation.

The anti-reversal claws 6a are provided individually in association with the film number indices "1", "2", "3", ... "7" and an end mark "E". To observe the film number indices "1", "2", "3", ... "7" and the end mark "E" provided on the underside of the respective anti-reversal claws 6a, a display window 3h is formed in the bottom of the cavity 3f. The anti-reversal claws associated with the film number index are equal in height, except the claw associated with the end mark "E" is higher than the other claws 6a and has a flat top surface. Thereby, upper end 11c of the pressing member 11 is maintained spaced a predetermined distance from the under surface of the lid 5 during photographing. But when the final sheet film unit 4 has been exposed, the pressing member 11 moves upward to bring the upper end 11c into engagement with a hole 5f, so as to secure the lid 5 to the pack housing 3.

Figure 4:
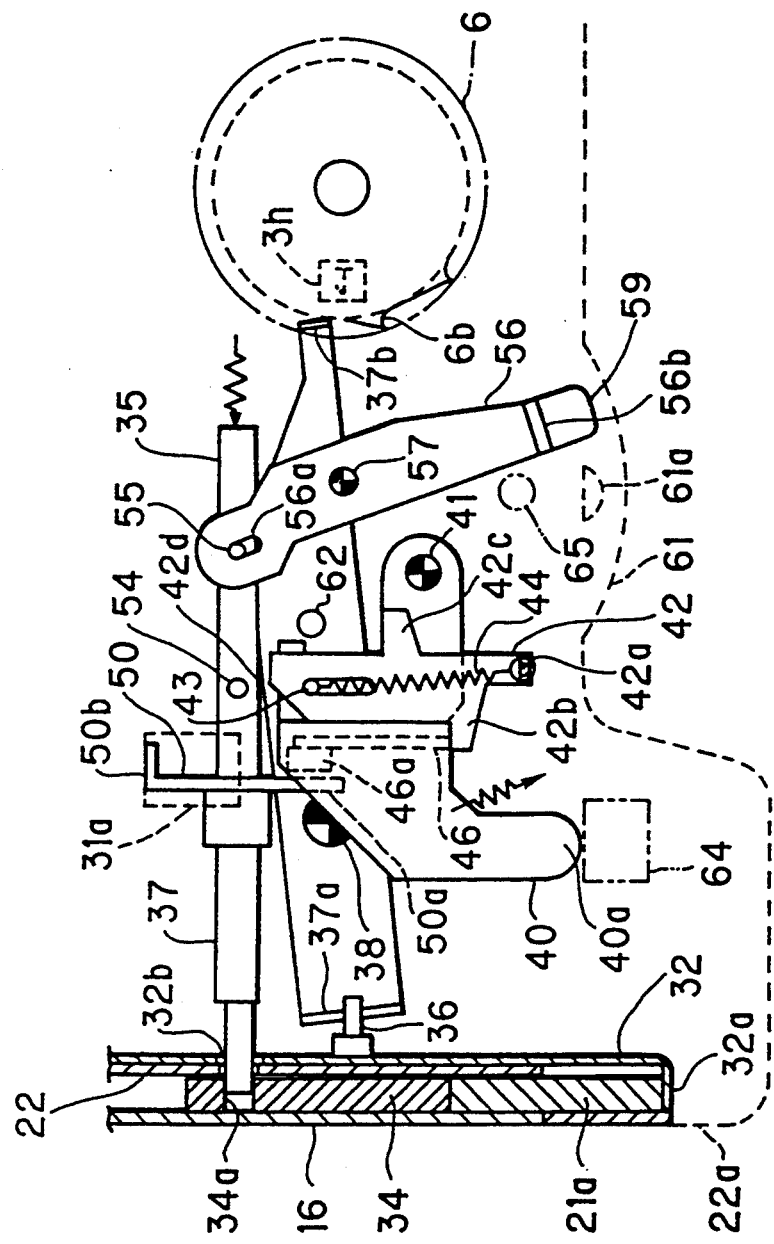
FIG. 4 is a view of a latch mechanism and a film counter mechanism in the initial position, partially in cross section, taken in the direction of the plane of the film pack and the pack holder.

Ratchets 6b are formed on the periphery of the counter disc 6, as shown in FIG. 4. As will be described later, the counter disc 6 is advanced stepwise in a direction by a pawl which is brought into engagement with the ratchets 6b.

The sheet film unit 4 is constituted by a 4×5 inch sheet film 13a and a sheath 13b made of a metal plate which backs the sheet film 13a on a base surface thereof and is folded to cover the four edges of the sheet film 13a. The sheath 13b may be made of a plastic resin sheet so long as the resin sheet helps to maintain the sheet film 13a even and also has sufficient strength.

As shown in FIG. 3, the pack housing 3 holds a plurality of such sheet film units, for example, seven sheet film units 4a, 4b, ... 4g stacked or overlaid one atop another. The sheet film units 4a to 4g are urged toward the front of the pack housing 3, that is, upward in FIG. 3, by a plate spring 12 which is secured at one end thereof to the inside of the rear wall 3e of the pack housing 3, that is, the bottom of the housing 3 in FIG. 3. Thereby, the topmost or front sheet film unit 4a is pressed against the inside surface of the lid 5. A light-trapping member or plush 17 is provided for preventing ambient light from entering through a gap between the lid 5 and a guide surface 18 for guiding the lid 5.

The pack holder 8 is constructed of a holder housing 16, a cover 21 hinged to a trailing end 16a of the holder housing 16 by means of a hinge 20, and a sliding frame or tray 22 slidable in the holder housing 16. A light-trapping plush 19 is provided for preventing ambient light from entering through a gap between the sliding tray 22 and the inside surface of the holder housing 16.

As shown in FIG. 3, the hinged cover 21 has an exposure aperture 23 having a smaller size than the sheet film unit 4. The margins of the exposure aperture 23 form reception surfaces 24 for receiving the front surface of the topmost sheet film unit 4a and positioning the sheet film unit 4a in an exposure position.

Referring again to FIG. 1, four leaf springs 26 are mounted on the hinged cover 21 with one end thereof secured in longitudinal grooves formed outside the reception surfaces 24. When the cover 21 is closed after the film pack 1 is loaded in the pack holder 8, the leaf springs 26 urge the film pack 1 rearward, that is, downward in the drawings, within the pack holder 8. The leaf springs 26 also operate to press the lowermost one of the sheet film units 4 against the rear wall of the holder housing 16 when that one sheet film unit 4 is ejected from the pack housing 3, as will be described in detail later.

The cover 21 further has a lateral ridge 27 and a pair of projections 28 in the vicinity of the hinge 20. The ridge 27 is brought into engagement with a lateral groove 2d formed on the top of the cap 2 when the film pack 1 is loaded and the cover 21 is closed. Thereby the cap 2 is arrested in the pack holder 8. The projections 28 push down the projections 7e and 7f of the fastening member 7 also when the cover 21 is closed. Thereby, the claws 7a and 7b are disengaged from the holes 5b and 5c of the sliding lid 5.

A chamber 31, which is formed in a leading end portion of the sliding tray 22, accommodates a latch mechanism for controlling the motion of the sliding tray 22 relative to the holder housing 16, and a counter advancing mechanism for controlling the stepwise advance of the counter disc 6 of the film pack 1.

FIGS. 4 and 5 illustrate the latch mechanism and the counter advancing mechanism in an initial operative position, that is, their condition when the film pack 1 is just loaded in the pack holder 8. A strip-like sliding lever 32 is provided on the inside of a longitudinal side wall of the sliding tray 22 and is slidable along that side wall. A leading end 32a of the sliding lever 32 is bent perpendicularly to the sliding direction of the lever 32. In the initial position, the bent portion 32a is clamped between a leg 21a of the cover 21 and a leading lug 22a of the sliding tray 22, so that the position is fixed.

The sliding tray 22, the sliding lever 32, and a plate 34 that is secured to a longitudinal side wall of the holder housing 16, have respective holes 22b, 32b and 34a formed therethrough. The holes 22b, 32b and 34a are aligned in the initial position shown in FIG. 4, and one end of a cylindrical lever 35 is inserted into these holes 22b, 32b and 34a so as to latch the sliding tray 22 and the sliding lever 32 to the holder housing 16. The lever 35 is urged toward the plate 34 by a spring. The sliding lever 32 is coupled to one end 37a of a counter advancing lever 37 by a pin 36 fixedly attached to the sliding lever 32. The counter advancing lever 37 is pivotal about an axle 38, and the other end 37b of the lever 37 forms a counter advancing pawl which is brought into engagement with the ratchets 6b so as to advance the counter disc 6.

A lever 40 disposed above the counter advancing lever 37, is pivotal about an axle 41 and is urged to swing in a counterclockwise direction. The lever 40 is curved in the middle portion thereof so as to have a difference in height between the left hand portion and the right hand portion of the lever 40, as seen in FIG. 4. A lever 42 is slidably disposed on the right hand lower portion of the lever 40. The lever 42 is urged toward the cylindrical lever 35 by a spring 44 which connects a leading end 42a of the lever 42 to a pin 43 fixed to the lever 40.

An L-shaped arresting lever 46 shown in FIG. 5 is pivotally mounted on the rear of the left hand higher portion of the lever 42. The arresting lever 46 is engaged at one end 46b with a claw 42b of the lever 42 so as to arrest the lever 42 in the initial position shown in FIG. 5. A spring 47 urges the arresting lever 46 to swing in a clockwise direction in FIG. 5. The other end 46a of the arresting lever 46 extends perpendicularly to the swinging direction of the lever 46. When the end 46a is pushed by an arm 50a of a lever 50, the arresting lever 46 is rotated in a counterclockwise direction in FIG. 5, thereby releasing the lever 42 from the arresting lever 46.

Figure 6:
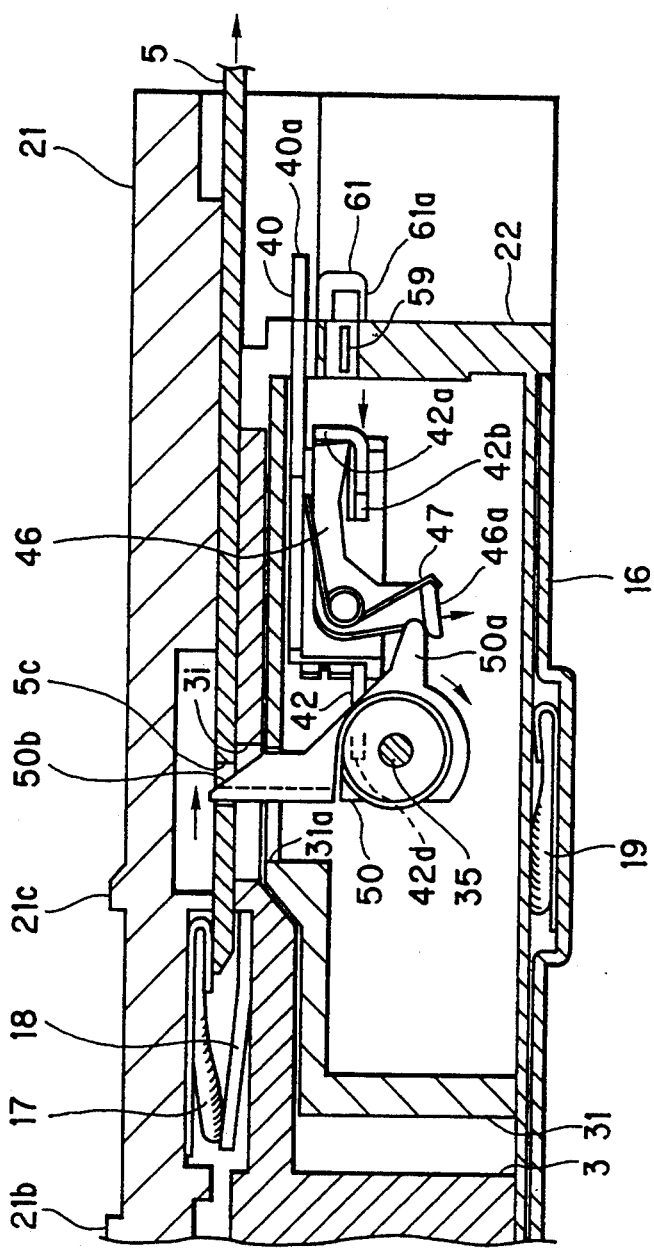
FIG. 6 is a view similar to FIG. 5, but illustrating the latch mechanism in an operative position wherein a lid is fully drawn out from the film pack.

The lever 50 is coupled to the lever 35 so as to pivot about the lever 35. A spring 51 urges the lever 50 to rotate in a clockwise direction in FIG. 5. A claw 50b of the lever 50 protrudes outward through a hole 31a of the chamber 31, so that the claw 50b contacts the inside surface of the lid 5 through a hole 31 (see FIG. 2) of the pack housing 3 when the film pack 1 is loaded in the pack holder 8. Thereafter when the lid 5 is pulled out to fully open the opening 3a of the pack housing 3, as shown in FIG. 6, the arm 50b of the lever 50 is engaged with the hole 5c of the lid 5. Thereby, the claw 50b limits the amount of pulling of the lid 5 out of the pack housing 3. When the lid 5 is further pulled out, the lever 50 is rotated in a clockwise direction in FIG. 6.

The lever 35 has a pair of pins 54 and 55 fixed thereto as shown in FIG. 4. The lever 35 is coupled to a lever 56 through engagement of the pin 55 with an oblique hole 56a of the lever 56. The lever 56 is pivotal about an axle 57 and has a bent end portion 56b. A colored flag, for example, a red-colored flag 59 is securely attached to the bent end portion 56b. The flag 59 appears in a window 61a formed in a semi-circular tab 61 that is formed in a middle portion of the leading end of the sliding tray 22, as shown in FIG. 1, when it is ready for an exposure. At that time, a claw 42d on a trailing end of the lever 42 is in mesh with the pin 54 to move the lever 35 to the right in FIG. 4, so as to withdraw the lever 35 from the holes 22b, 32b and 34a.

The lever 42 also has a claw 42c which is engaged with a pin 62 fixed to the upper side of the counter advancing lever 37 when the counter advancing lever 37 is swung to prepare for a counter advance operation. By this engagement, the lever 42 is returned to the initial position. Projections 64 and 65 are integrally formed on the inside surface of the lid 5, as shown in FIG. 5. The projection 64 pushes the leading end 40a of the lever 40 to pivot the lever 40, when the lid 5 is moved back to the closed position after having been pulled out. The projection 65 is engaged with the bent end portion 56b through a cut-out 3j (see FIG. 2) after it is ready for an exposure, so as to enable the lid 5 and the sliding tray 22 to be pulled out together from the holder housing 16.

Figure 13:
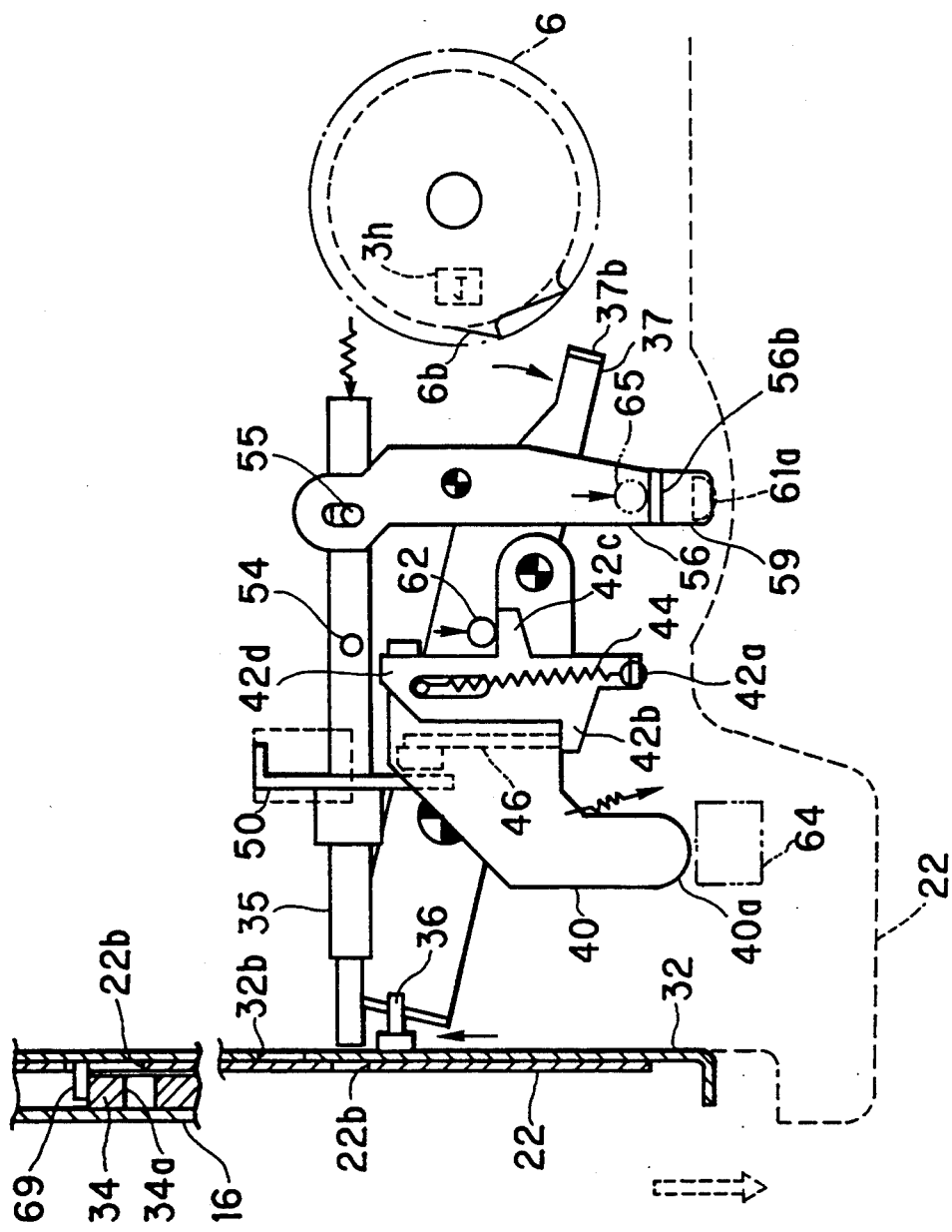
FIG. 13 is a view similar to FIG. 4, but illustrating the latch mechanism and the film counter mechanism in the same position as that shown in FIG. 12.
Figure 14:
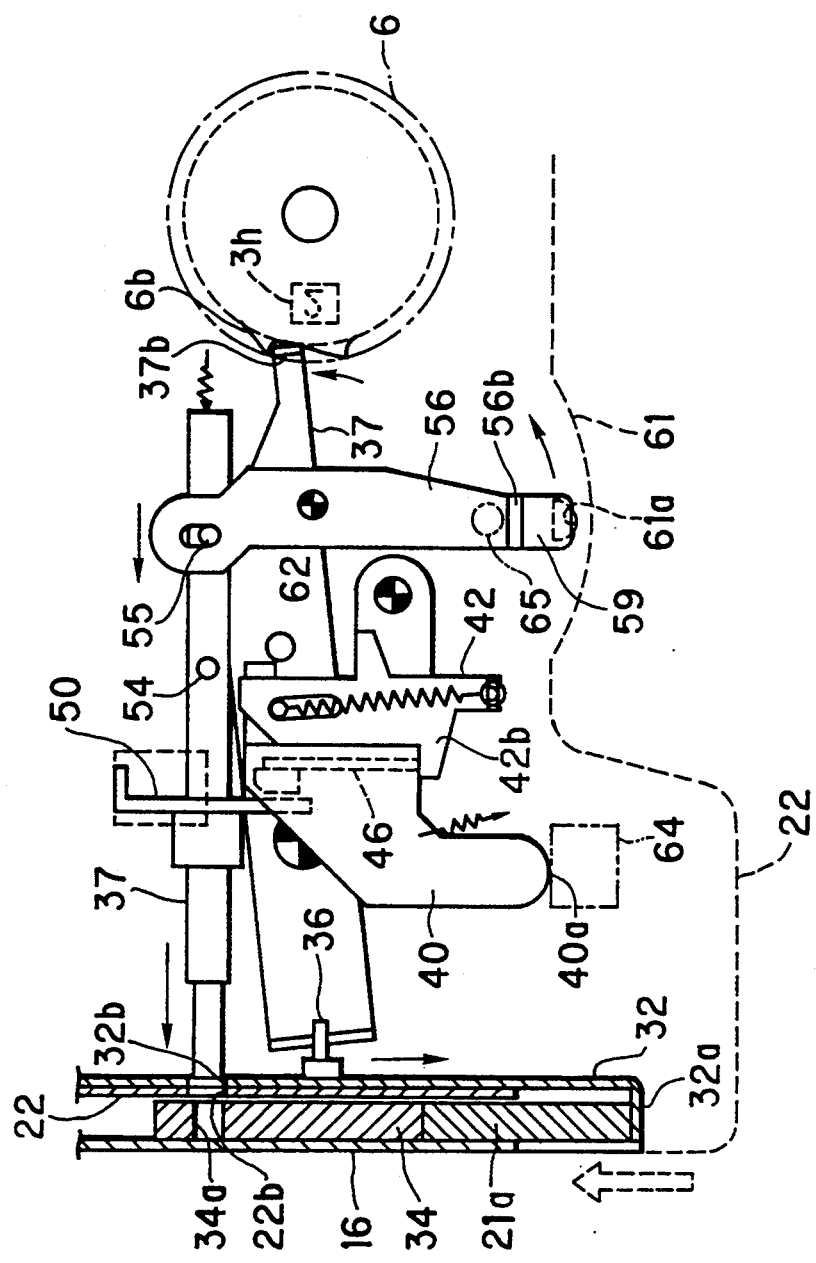
FIG. 14 is a view similar to FIG. 4, but illustrating the latch mechanism and the film counter mechanism in an operative position wherein the sliding frame of the pack holder has returned to the initial position from the position shown in FIG. 12.

As shown in FIG. 3, the pack holder 8 is attached to a large format camera as to tightly contact the exposure aperture 23 of the cover 21 of the pack holder 8 with an exposure frame 66 of the camera. To position the pack holder 8, ridges 21b and 21c are provided on the outside surface of the cover 21. A knob 67 is provided for sliding the cover 21. A rotatable latch 68 is provided for fixing the sliding lid 5 on the sliding tray 22 when the pack holder 8 loaded with the film pack 1 is carried about. The latch 68 may be rotated manually to engage the arcuate rim of the latch 68 in a slit 5e of the lid 5. Film number display windows are formed in the holder housing 8 and the sliding tray 22 both in positions corresponding to the counter window 3h, although these windows are not shown in the drawings. A pin 69 (FIG. 13) is attached to the trailing end of the sliding lever 32. The pin 69 engages in a longitudinal slit 22b formed in a trailing end portion of the sliding tray 22, as is shown in FIG. 13.

The above-described embodiment operates as follows:

When the film pack 1 is not loaded in the pack holder 8, the claw 50b of the lever 50 protrudes from the chamber 31 through a hole 31a, but the end 46a of the arresting lever 46 is not engaged with the arm 50a of the lever, as shown in FIG. 4, so as to prevent accidental release of the lever 42. The lever 40 is not rotated because the leading end 40a contacts the projection 64.

When the cover 21 is closed after the film pack 1 is loaded in the pack holder 8, the ridge 27 is engaged in the groove 2c to hold the cap 2 between the holder housing 16 and the cover 21 (see FIG. 3). Simultaneously, the projections 7e and 7f are pushed down by the projections 28 to disengage the claws 7a and 7b from the holes 5b and 5c of the lid 5, thereby releasing the lock of the lid 5.

Figure 7:
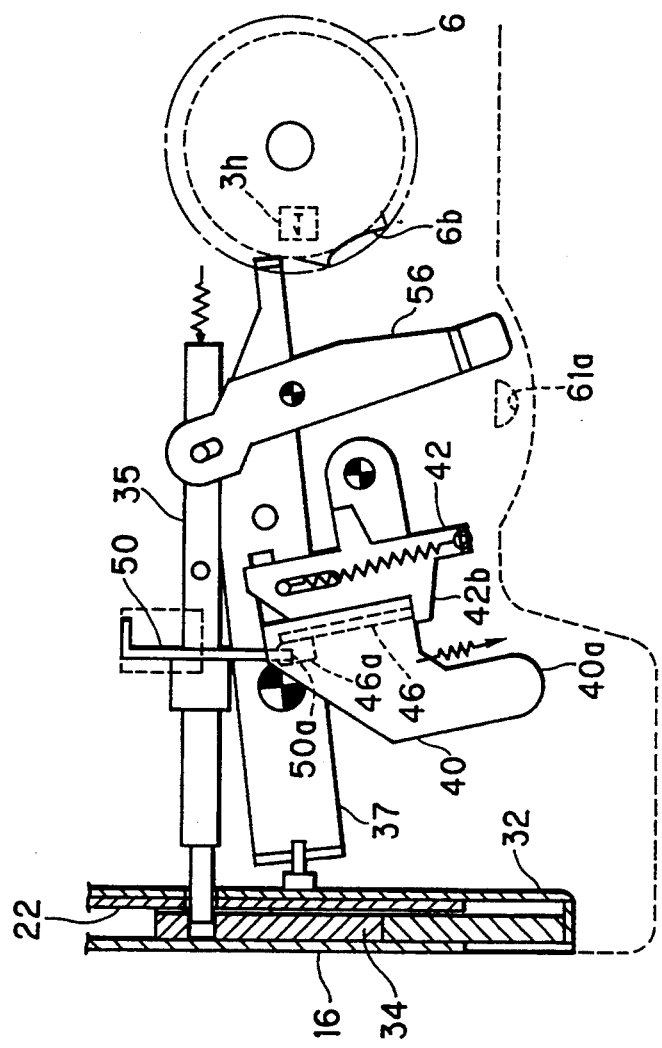
FIG. 7 is a view similar to FIG. 4, but illustrating the latch mechanism and the film counter mechanism in their position at the beginning of the drawing operation of the lid.

When the lid 5 begins to be pulled out from the pack holder 8 attached to the exposure frame 66 of the large format camera, the lever 40 is released from the projection 64 and hence rotated to a position shown in FIG. 7, thereby bringing the end 46a of the lever 46 to a position wherein the end 46a can be engaged with the arm 50a.

Figure 8:
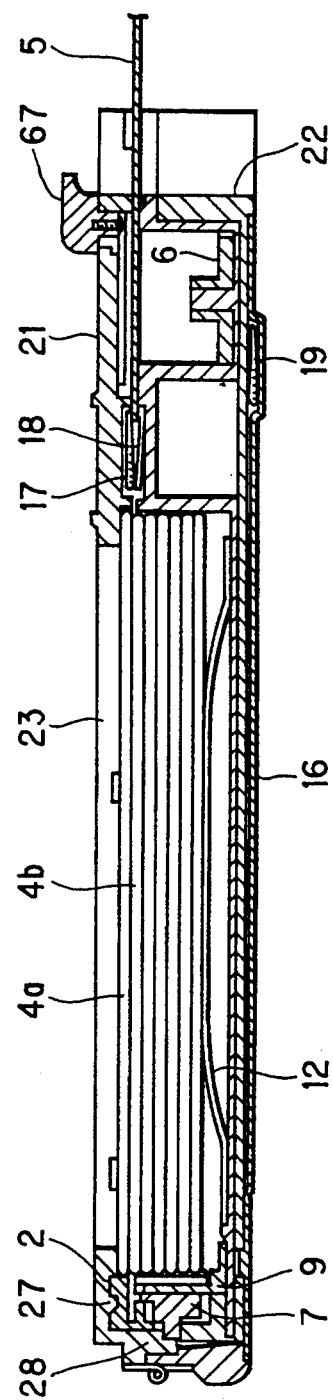
FIG. 8 is a view similar to FIG. 3, but illustrating the film pack and the pack holder in the same position as that shown in FIG. 6.

When the lid 5 is further pulled out to a position shown in FIGS. 6 and 8, the opening 3a of the pack housing 3 is fully opened, so that the topmost sheet film unit 4a is pushed by the plate spring 12 against the receiving surface 24 of the pack holder 8 and ejected through the opening 3a. At that time, the claw 50b is engaged in the hole 5c, as shown in FIG. 6, so that the photographer will feel a limited resistance when pulling the lid 5 farther from this position to an end position a small distance from the former position. In the end position, the lid 5 cannot be pulled out any farther. As shown in FIG. 7, the lever 35 continues to lock the sliding tray 22 and the lever 32 to the holder housing 8, as shown in FIG. 7, so as to prevent the sliding tray 22 and the lever 32 from being moved along with the lid 5 relative to the holder housing 8. Therefore, the pack housing 3 cannot be pulled out together with the lid 5.

Figure 9:
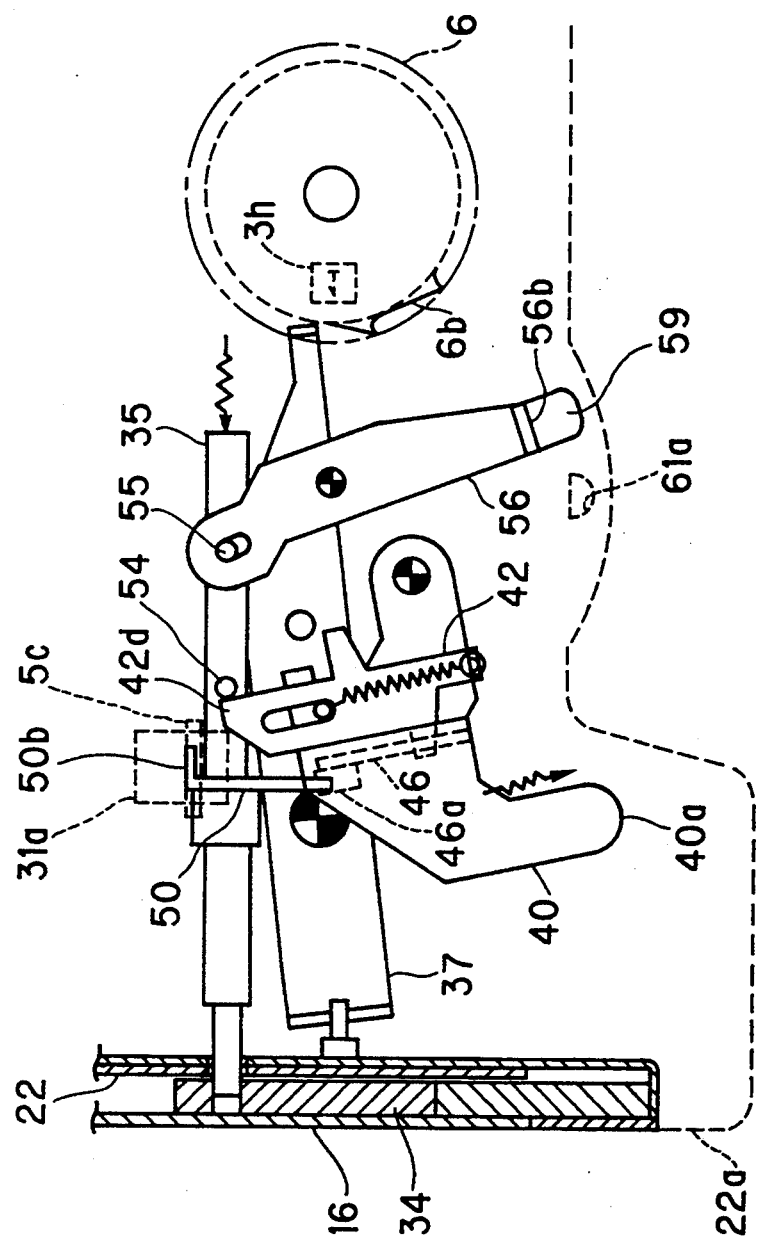
FIG. 9 is a view similar to FIG. 4, but illustrating the latch mechanism and the film counter mechanism in the same position as that shown in FIG. 6.

The lever 50 is rotated in the clockwise direction while the lid 5 is pulled out after the claw 50b is engaged in the hole 5c. The arm 50a then pushes the end 46a of the arresting lever 46 downward so as to swing the arresting lever 46 in the counterclockwise direction. As a result, the lever 42 is released from the arresting lever 46, and is moved by the force of the spring 44 toward the lever 35, so that the claw 42d of the lever 42 is engaged with the pin 54 of the lever 35, as shown in FIG. 9.

Figure 10:
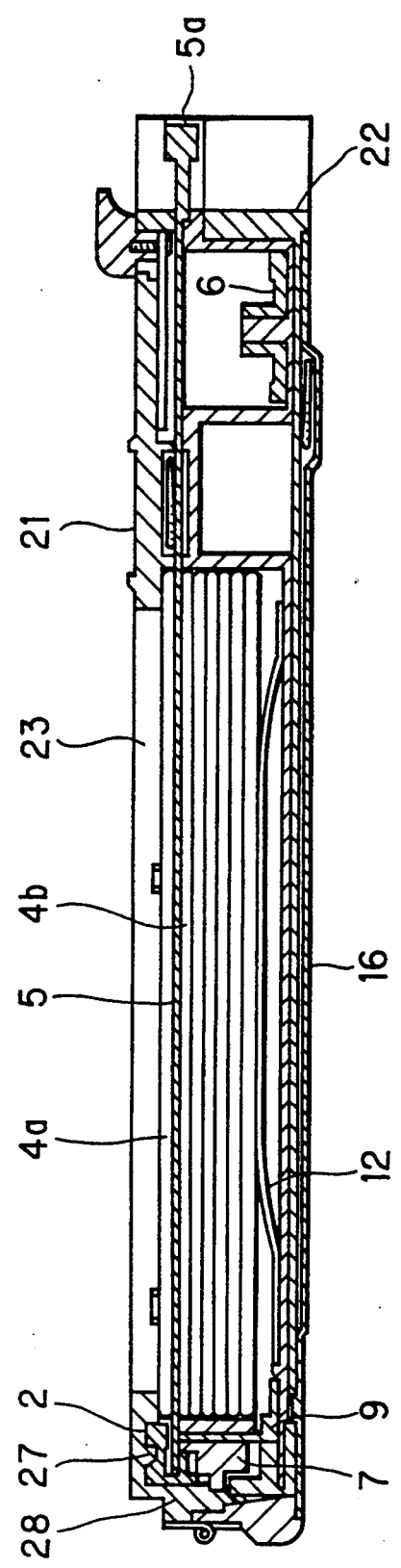
FIG. 10 is a view similar to FIG. 3, but illustrating the film pack and the pack holder in an exposure position.
Figure 11:
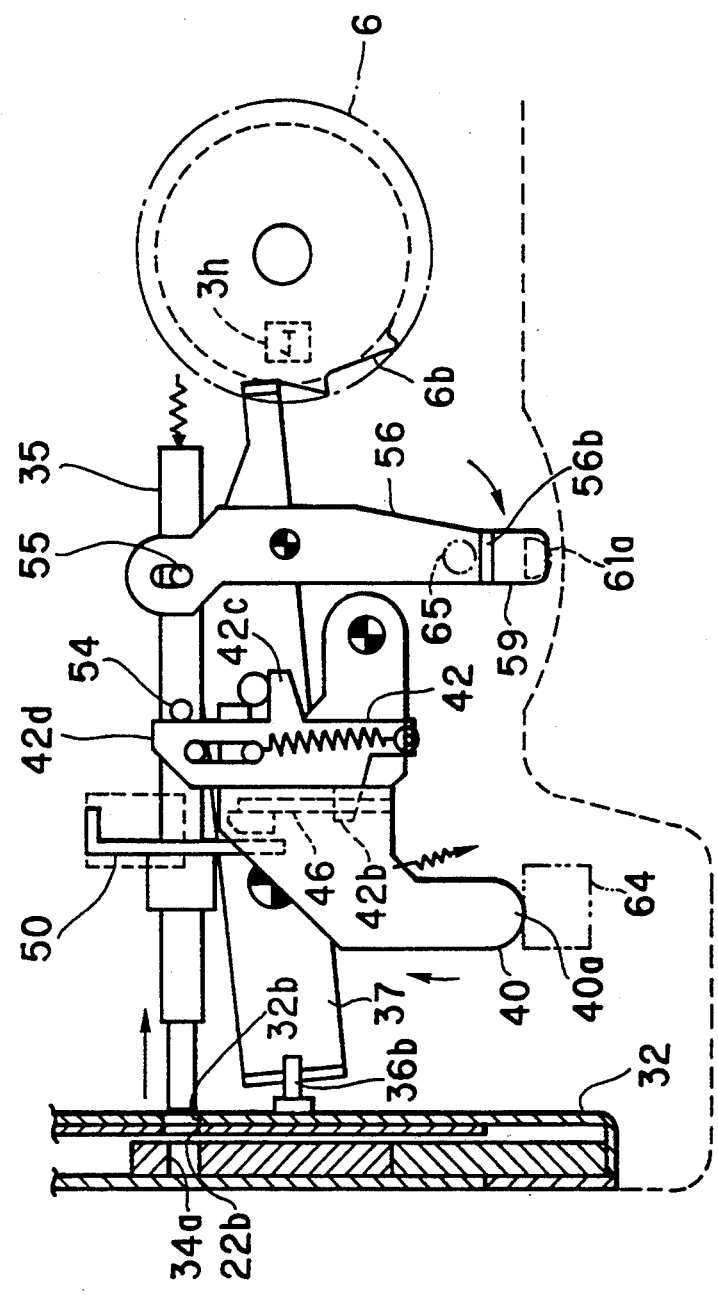
FIG. 11 is a view similar to FIG. 4, but illustrating the latch mechanism and the film counter mechanism in an operative position wherein the lid is slid back into the film pack.

Thereafter when the lid 5 is moved back to the initial position, as shown in FIG. 10, the lid 5 is inserted between the first sheet film unit 4a and the next sheet film unit 4b. Thereby, the sheet film unit 4a is maintained evenly positioned in the exposure position. In this condition, the projection 64 pushes the leading end 40a of the lever 40 so as to swing the lever 40 in the clockwise direction, as shown in FIG. 11. Because the lever 42 swings together with the lever 40, the pin 54 is pushed by the claw 42d to the right as seen in FIG. 11, so that the lever 35 is withdrawn from the holes 22b, 32b and 34a. Simultaneously, the pin 55 swings the lever 56 clockwise, so as to display the flag 59 in the window 61a for indicating that the film pack is ready for an exposure. At that time, the bent end portion 56b of lever 56 is displaced from the path of the projection 65. In this condition, the shutter of the large format camera may be released to expose the first sheet film unit 4a.

Figure 12:
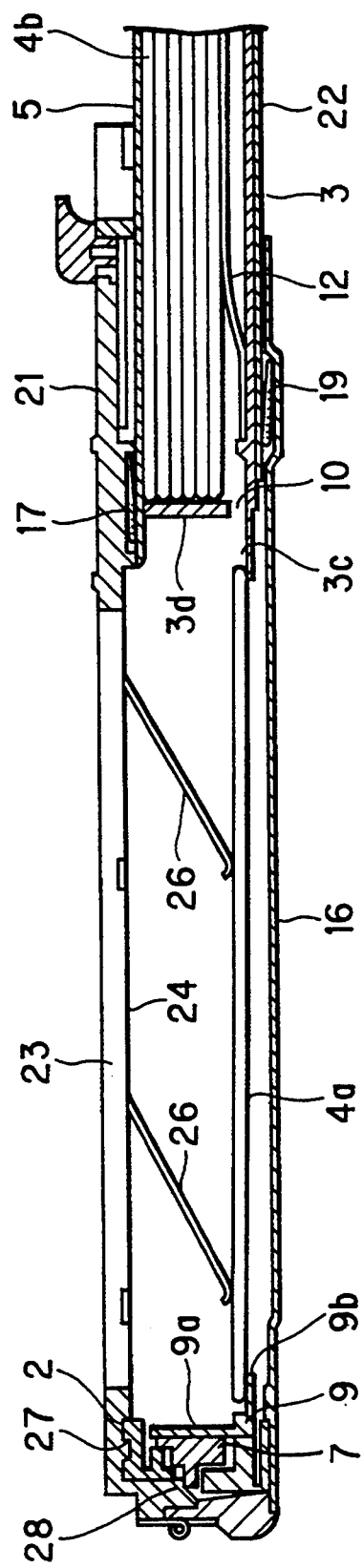
FIG. 12 is a view similar to FIG. 3, but illustrating the film pack and the pack holder in a final position wherein the film pack and a sliding frame of the film holder are drawn out from a holder main body.

After the exposure of the first sheet film unit 4a, the lid 5, the pack housing 3, the sliding tray 22 and the lever 32 are pulled out together from the holder housing 8 by pulling the grip 5a, because the projection 65 is engaged with the bent end portio 56b. As shown in FIG. 12, only the cap 2 remains in the trailing end portion of the pack holder 8. At that time, the exposed first sheet film unit 4a stays behind and does not move with the pack of unexposed sheet film units, because it is confined by the edges of the receiving surface. As a result, the exposed sheet film unit 4a is slipped out of the pack housing through a gap between the receiving surface and the upper edge of the separating wall 3d. The sheet film unit 4a is then pressed down to the bottom of the holder housing 19a by the leaf springs 26. Because the lid 5 closes the opening 3a of the pack housing 3, the sheet film units 4 in the pack housing 3 are shielded from ambient light even when the film pack 1 is pulled out from the pack housing 8.

When the pack housing 3 is drawn out to a position shown in FIG. 12, the pin 69 on the trailing portion of the sliding lever 32 strikes the leading end of the plate 34, as shown in FIG. 13. As a result, the position of the lever 32 is shifted relative to the sliding tray 22 when the pack housing 3 is drawn farther out, because only the sliding tray 22 can be pulled out a distance equal to the dimension of the longitudinal slit 22b along with the pack housing 3. Thereby, the pin 36 on the leading portion of the lever 32 is relatively moved toward the lever 35. As a result, the counter advancing lever 37 is swung in the clockwise direction, preparing for a counter advance operation. Because the lower end 11b of the pressing member 11 contacts the anti-reversal claw 6a of the counter disc 6, the counter disc 6 is prevented from being rotated in the counterclockwise direction, even if the counter advancing pawl 37b lightly contacts the ratchet 6b of the counter disc 6 during the clockwise swinging of the counter advancing lever 37. Simultaneously, the pin 62 pushes the claw 42c of the lever 42 forwardly of the pack holder 8, that is, downward in FIG. 13, against the force of the spring 44, so as to reset the lever 42 to the initial position. In the initial position, the lever 42 is arrested by the arresting lever 46.

Thereafter when the film pack 1 is pushed into the holder housing 16 together with the sliding tray 22, by pushing the grip 5a, the exposed sheet film unit 4a whose trailing end is restrained by the L-shaped plate 9 is inserted back into the pack housing 3 through the recovery mouth 10 between the separating wall 3d and the rear wall 3e of the pack housing 3. The sheet film unit 4a passing through the recovery mouth rides on the plate spring 12 so as to be positioned at the bottom of the stack of sheet film units 4.

When the film pack 1 is completely inserted back into the holder housing 16 in this way, the sliding lever 32 is returned to the initial position wherein the bent leading end 32a strikes the edge of the leg 21a. Thereby, the pin 36 is reset to the initial position, while pivoting the counter advancing lever 37 counterclockwise. The counter advancing pawl 37b then meshes with the ratchet 6b to rotate the counter disc 6 by one increment. As a result, the film number "2" is displayed in the counter window 3h. Simultaneously, the flag 59 is retracted from the window 61a, and the locking of the lid 5 by the bent end portion 56b is released.

Furthermore, the holes 22b, 32b and 34a are again aligned, whereupon the lever 35 is inserted into these holes to latch the sliding tray 22 to the holder housing 16. In this way, the film pack 1 and the pack holder 8 are returned to the initial position as shown in FIGS. 3 and 4, except for the position of the stacked sheet film units 4a to 4g, that is, the second sheet film unit 46 is now in contact with the inside surface of the lid 5 and the first sheet film unit 4a is at the bottom of the stack. In the same way as above, each exposed sheet film unit is replaced by the next unexposed sheet film unit so as successively to present the sheet film units to the exposure station merely by sliding the lid 5. The film number displayed in the counter window 3h can be observed through the film number display windows formed in the holder housing 16 and the sliding tray 22.

When the final sheet film unit 4g has been exposed and transported from the exposure position to the bottom of the stack of sheet film units 4a to 4g, in the same way as described above, all of the exposed film sheet units 4a to 4g are stacked on atop another in the pack housing 3 in order of photographing, from the top to the bottom. The lid 5 closes the opening 3a in the manner as shown in FIG. 3. The counter window 7h displays the end mark "E", and the pressing member 11 is lifted so as to engage its upper end 11c in the hole 5f. Thereby, the lid 5 is prevented from being pulled out. Simultaneously, an anti-lock mechanism (not shown) of the hinged cover 21 is actuated to release the lock of the cover 21. Thereby, the cover 21 can be opened to remove the used film pack 1 from the pack holder 8, by operating the knob 67.

When the cover 21 is opened, the projections 7e and 7f are released from the pressure of the projections 28, so that the fastening member 7 springs up under the force of the resilient legs 7c and 7d. Thereby the claws 7a and 7b are engaged in the holes 5b and 5c so as to join the cap 2 to the lid 5. Because the stepped portion 5d of the lid 5 is engaged with the leading end portion of the pack housing 3, the cap 2 is thus fastened to the pack housing 3. Also the pressure of the ridge 27 on the cap 2 is released, enabling the used film pack 1 to be removed from the pack holder 8. It is to be noted that the hinged cover 21 can be opened by actuating the knob 67 so long as the film pack 1 is in the initial position shown in FIG. 3. Therefore, it is possible to exchange the film pack 1 before all the available sheet film units have been exposed, for example, in order to alternately perform color photography and black and white photography. The exchange of the film pack 1 containing exposed and unexposed sheet film units 4 therein can be performed with no problem, because the counter disc 6 stops at a position to display the number of exposed sheet film units.

FIGS. 15, 16A, 16B and 16C illustrate another embodiment of a film pack 70 which permits changing the film pack 70 without the need for removal of a pack holder 71 for the film pack from a camera. The film pack 70 has a cap 72 which extends over the entire length of the film pack 70. In this film pack 70, a sliding frame 73 having an opening 73a is disposed in the cap 72, and a sliding lid 75 is provided to open and close the opening 73a. The sliding frame 73 has a film chamber 77 for receiving a plurality of sheet film units 4 stacked one atop another.

The sheet film units 4 in the film chamber 77 are urged by a plate spring 76 toward the exposure opening. The sliding frame 73 also has a chamber 78 disposed in the vicinity of a grip 75a of the sliding lid 75 in the closed position. The chamber 78 accommodates a latch mechanism for latching the lid 75 and the cap 72 to the sliding frame 73, so as to protect the sheet film units 4 from ambient light. For example, a stack of eight sheet film units 4a to 4h is received in the film chamber 77 of the sliding frame 73 of the film pack 70, as shown in FIGS. 16A to 16C.

The latch mechanism is constituted by a stick-like lever 80 movable in the axial direction thereof, and a leaf spring 81 urging the lever 80 toward the lid 75. The chamber 78, the lid 75 and the cap 72 have respective holes 78a, 75b and 72a which are located coaxially of the lever 80 in the initial operative position shown in FIG. 16A, that is, the position immediately after the film pack 70 has been loaded in the pack holder 71. The holes 78a, 75b and 72a are disposed in front of the lever 80, that is, above the lever 80 in the drawings. Holes 78b and 72b are also formed in the chamber 78 and the cap 72, which holes are located to the rear of the lever 80, that is, below the lever 80 in FIG. 16. The holes 78b and 72b are also coaxial with the lever 80 in the initial position.

One end of the spring 81 is secured to an inner wall portio of the chamber 78, and the other free end of the spring 81 extends into the film chamber 77 through a hole 82a formed in a separating wall 82 of the chamber 78 abutting the film chamber 77. As shown in FIG. 16A, the free end of the spring 81 is depressed downward in FIG. 16A by the bottom of the stacked sheet film unit 4a to 4h in the initial position. Thereby, the lever 80 is set to the lowest position thereof wherein the lower end of the lever 80 is inserted in the holes 78b and 72b, while the upper end of the lever 80 is outside the hole 75b. Accordingly, the cap 72 and the sliding frame 73 are latched, while the lid 75 is not latched in the initial position.

When the sliding lid 75 is pulled out to open the opening 73a of the film chamber 77, as shown in FIG. 16B, the stack of sheet film units 4a to 4h is lifted by the plate spring 76 so as to position the first slit film unit 4a in a position to be exposed through the opening 73a. As the sheet film units 4a to 4h move upward, the free end of the spring 81 resiliently moves upward to raise the lever 80.

Thereafter when the lid 75 is moved back to close the opening 73a, the lid 75 is inserted between the first and second sheet film units 4a and 4b. Thereby, the correct positioning of the first sheet film unit 4a in the exposure position is ensured. As the upper end of the lever 76 is disposed in the hole 75b of the lid 75 in this condition, the lower end of the lever 80 is displaced from the hole 72a of the cap 72. Accordingly, the latch between the sliding frame 73 and the cap 72 is released, and the lid 75 is latched to the sliding frame 73. The first sheet film unit 4a is exposed with the parts in this condition.

After the exposure of the first sheet film unit 4a, the lid 75 is again pulled out. But then, also the sliding frame 73 is pulled out together with the lid 75 while the cap 72 stays in the pack holder 72, as shown in FIG. 16C. As a result, the exposed sheet film unit 4a, which is left behind, is depressed by leaf springs 83 of the pack holder 71 to the inside of the rear wall, that is, the bottom wall in FIG. 16C, of the cap 72. Thereafter when the sliding frame 73 is returned to its initial position, the exposed sheet film unit 4a rides on the inside surface of the rear wall of the sliding frame 73 and then on the plate spring 76 to be guided to the bottom of the stack of the sheet film units.

In this way, the film pack 70 and the pack holder 71 are returned to the initial position shown in FIG. 16A, except that the sheet film unit 4a is now on the bottom of the stack and the second sheet film unit 4b is on the top of the stack. The sheet film units 4b to 4h may then be exposed in turn by repeating the above operation.

It is to be noted that the just-described latch mechanism is applicable to any suitable type film pack other than the film pack 70 shown in FIG. 15.

Figure 17:
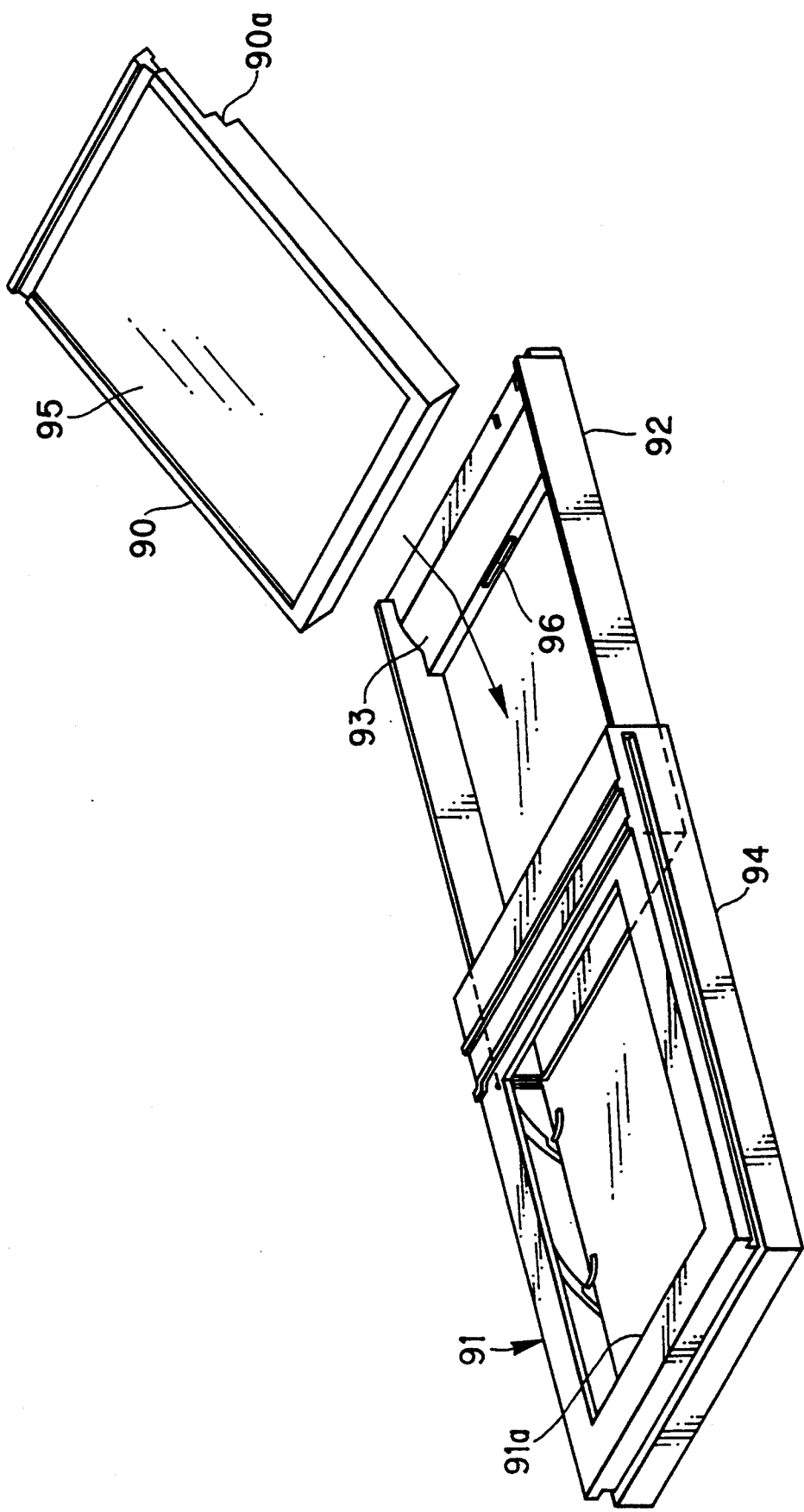
FIG. 17 is a perspective view of a film pack and a pack holder according to another embodiment of the invention.

FIG. 17 illustrates a pack holder and a film pack according to another embodiment of the invention. When loading the film pack 90, a sliding tray 92 of the pack holder 91 is drawn out from a holder housing 94, and the film pack 90 is diagonally inserted into the sliding tray 92. For facilitating this insertion, an inclined surface 93 is formed at a leading end of the sliding tray 92 in the drawing-out direction. On the other hand, the film pack 90 has a stepped portion 90a formed in a bottom portion of one end of the film pack 90 that corresponds to the inclined surface 93. A ridge 96 is provided for click-in engagement between the film pack 90 and the sliding tray 92.

Figure 18A:
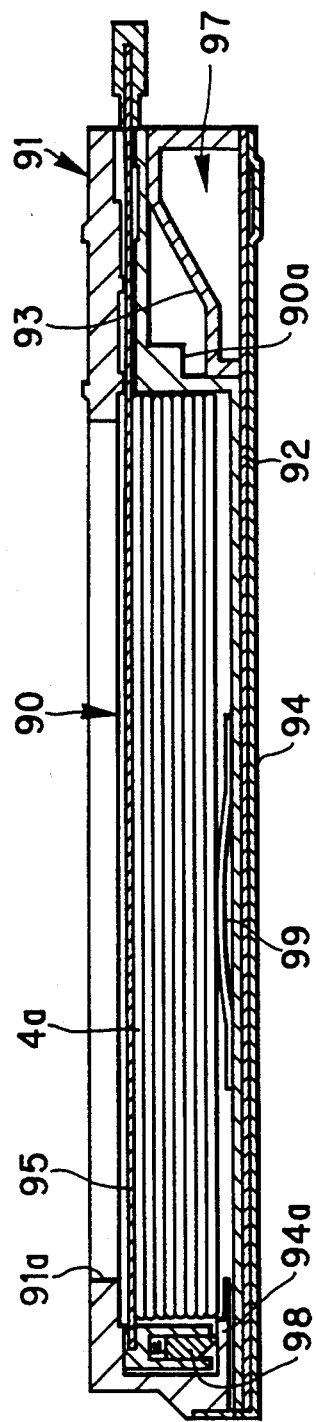
FIGS. 18A to 18C are sectional views illustrating a cap construction of the film pack according to another embodiment of the invention.
Figure 18B:
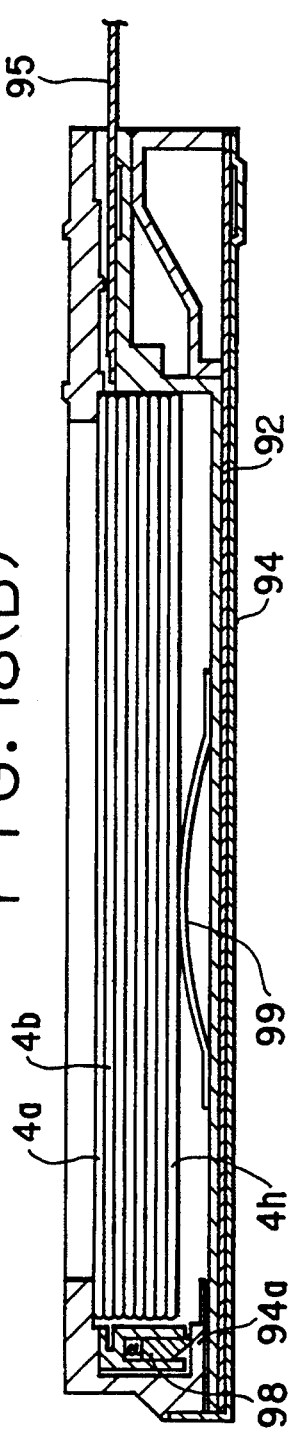
Figure 18C:
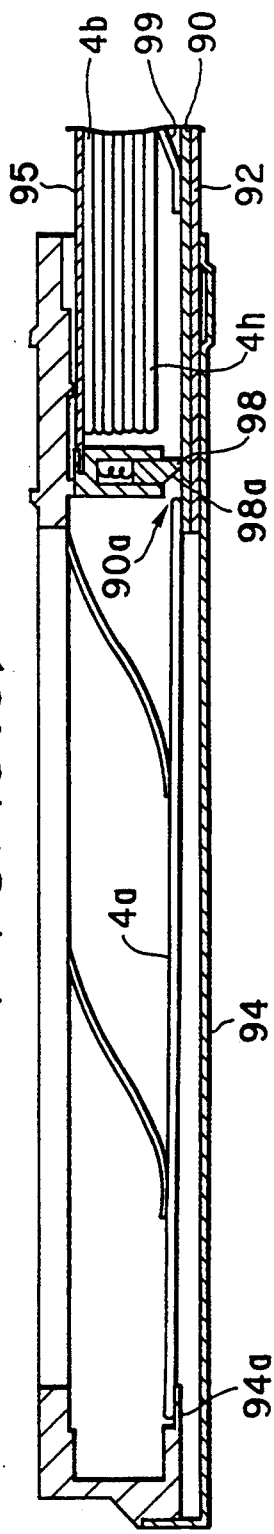

A chamber 97 is formed below the inclined surface 83, as shown in FIGS. 18A to 18C, so as to accommodate a film counter mechanism and a latch mechanism for latching the sliding tray 92 to the holder housing 94.

FIGS. 18A to 18C also illustrate an embodiment of a cap for the film pack 90, which has a different construction from the above-described embodiments. That is, the cap is constituted by a linear shutter 98 movable linearly, and urged by a spring force to close a film recovery mouth 90a of the film pack 90.

In the initial operative position shown in FIG. 18A, wherein the film pack 90 has just been loaded in the pack holder 91, the shutter 98 is pushed up by a lug 94a formed in an innermost corner of the holder housing 94. In cooperation with this, the lid 95 is unlocked by a not-shown mechanism. When the lid 95 is pulled out, as shown in FIG. 18B, the topmost sheet film unit 4a is moved into the exposure position. Thereafter, the lid 95 is pushed back to be inserted between the first sheet film unit 4a and the next sheet film unit 4b. In this condition, photographing can be performed.

After the exposure of the first sheet film unit 4a, the film pack 90 and the sliding tray 92 are pulled out from the holder housing 94 together with the lid 95 by pulling out the lid 95, because the lid 95 is locked to the film pack 90.

When the film pack 90 and the sliding tray 92 are drawn out by a predetermined distance from the holder housing 94, the exposed sheet film unit 4a is moved down to the bottom of the holder housing 94. Thereafter, when the film pack 90 and the sliding tray 92 are pushed back into the holder housing 94, the exposed sheet film unit 4a pushes a tapered end surface 98a of the shutter 98 so as to open the shutter 98, and so the unit 4a moves to the bottom of the film pack 90 between the bottom sheet film unit 4h and a plate spring 99.

Figure 19:
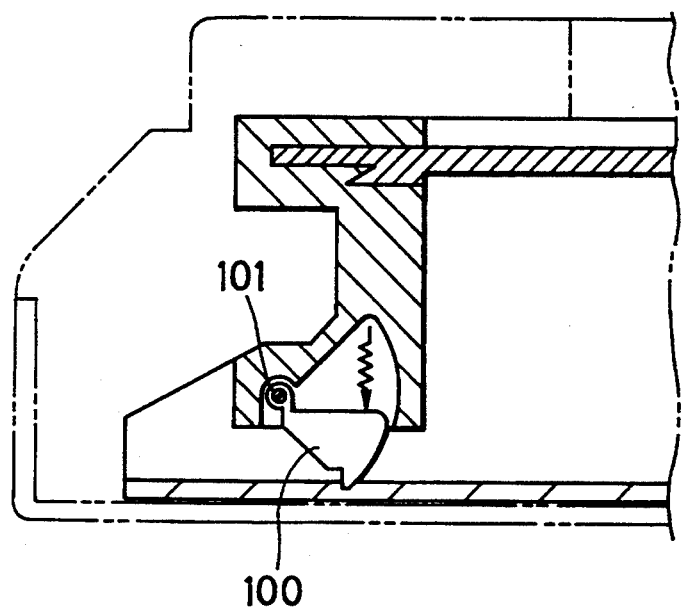
FIG. 19 is a sectional view of another cap construction of the film pack.

FIG. 19 illustrates another embodiment of a cap, which has a hinged shutter 100 pivotal about an axle 101, instead of the linear shutter 98.

Although the shutter 98 is mounted in the film pack 90 shown in FIG. 17, it is possible to mount the shutter 98 or 100 on any suitable type film pack other than the film pack 90.

The present invention has been described in detail with respect to the preferred embodiments with reference to the drawings, but the present invention is not to be limited to the above-described embodiments. On the contrary, various modifications may be possible without departing from the scope and spirit of the invention as defined in the appended claims.

What is claimed is:

1. A sheet film pack comprising:
   a pack housing for receiving a plurality of sheet film units in a stack therein;
   an opening formed in a front side of said pack housing for placing a topmost one of said sheet film units in an exposure station through said opening;
   a lid slidable relative to said pack housing between a closed position closing said opening in light-tight fashion and an open position opening said opening;
   a film recovery mouth formed in said pack housing at a trailing end thereof with respect to the direction of sliding said lid toward said open position; and
   closing means for openably closing said film recovery mouth in light-tight fashion,
   said closing means comprising a cap removably attached to said pack housing so as to close said film recovery mouth, said cap catching said lid so as to arrest said lid in said closed position when said cap is attached to said pack housing.

2. A sheet film pack as recited in claim 1, wherein said cap is attached to said trailing end of said pack housing.

3. A sheet film pack as recited in claim 1, wherein said cap extends over the height of said pack housing.

4. A sheet film pack as recited in claim 1, further comprising a latch mechanism for latching said lid to said pack housing and latching said pack housing to a film pack holder holding said sheet film pack.

5. A sheet film pack as recited in claim 1, further comprising a film counter for counting and displaying the number of exposed sheet film units.

6. A sheet film pack as recited in claim 5, wherein said counter comprises a counter disc mounted in said pack housing for displaying the number of exposed sheet film units, said counter disc being movable by one unit of indicia upon each receipt of an external mechanical advance signal.

7. A film pack holder for holding a sheet film pack as recited in claim 6, said film pack holder comprising;
   a holder housing;
   a sliding tray for receiving said sheet film pack and slidably mounted in said holder housing; and
   a counter advancing mechanism outputting said mechanical advance signal to said counter disc of said sheet film pack responsive to reciprocating movement of said pack receiving portion and said lid relative to said holder housing.

8. A film pack holder comprising a holder housing and a sliding tray slidably mounted in said holder housing, said sliding tray receiving a sheet film pack containing a stack of sheet film units, said sheet film pack having a pack housing, an opening formed in said pack housing, and a lid slidable between a closed position closing said opening in light-tight fashion and an open position exposing a topmost one of said sheet film units through said opening, and an automatic latch mechanism comprising:

an arresting means movable between an arrest position for arresting said sliding tray in said holder housing and a release position for releasing the arrest of said sliding tray;

swingable means stopped in a first position by said lid in said closed position, and swung to a second position when said lid is slid to said open position, and thereafter returned to said first position by said lid when said lid is returned to said closed position;

sliding means coupled to said swinging means such that said sliding means is engaged with said arresting means when said lid is in said open position, and thereafter brings said arresting means into said release position when said lid is returned to said closed position;

lid locking means for locking said lid to said sliding tray in said closed position in response to the motion of said arresting means to said release position;

returning means for returning said sliding means to an initial position disengaged from said arresting means when said sliding tray is drawn out from said holder housing together with said lid after said lid is locked by said lid locking means to said sliding tray; and limiting means for preventing said arresting means from being returned to said arrest position until said sliding tray is fully inserted back into said holder housing after said sliding means is disengaged by said returning means from said arresting means.

9. A film pack holder comprising a housing for a plurality of sheet film units in a stack, and an automatic latch device of a film changing mechanism for placing said plurality of sheet film units in turn in an exposure aperture formed in said housing, said film changing mechanism comprising:

a sliding tray slidable relative to said housing and holding said plurality of said sheet film units in a stack;

a sliding lid for shielding light from entering through said exposure aperture in a closed position thereof, and allowing a topmost one of said sheet film units to be exposed through said exposure aperture in an open position thereof;

means for moving said topmost of said sheet film units, after exposure, into the bottom of said plurality of sheet film units, and simultaneously placing the next uppermost sheet film unit in said topmost position, by reciprocating said sliding lid between said closed position and said open position;

means for latching said sliding tray so as to prevent movement of said sliding tray relative to said housing, said latching means being changed over from a latch position into a release position by one reciprocating movement of said sliding lid relative to said sliding tray; and means for arresting said sliding lid in cooperation with said latching means so as to prevent movement of said sliding lid relative to said sliding tray when said sliding tray is not latched, said arresting means allowing the reciprocating movement of said sliding lid relative to said sliding tray, said arresting means being changed over from an arrest position to a release position by one reciprocating movement of said sliding tray relative to said housing.

10. A film pack holder as recited in claim 9, wherein said film pack has an opening for passing a topmost one of said sheet film units therethrough toward said exposure aperture, said opening being formed in a side of said film pack facing said exposure aperture when said film pack is loaded in said housing, and said sliding lid is mounted in said film pack and slidable to open and close said opening.

11. A sheet film pack comprising:

a pack housing for receiving a plurality of sheet film units in a stack therein;

an opening formed in a front side of said pack housing for placing a topmost one of said sheet film units in an exposure station through said opening;

a lid slidable relative to said pack housing between a closed position closing said opening in light-tight fashion and an open position opening said opening;

a film recovery mouth formed in said pack housing at a trailing end thereof with respect to the direction of sliding said lid toward said open position; and closing means for openably closing said film recovery mouth in light-tight fashion, said closing means comprising a shutter device slidable to open and close said film recovery mouth.

12. A sheet film pack comprising:

a pack housing for receiving a plurality of sheet film units in a stack therein;

an opening formed in a front side of said pack housing for placing a topmost one of said sheet film units in an exposure station through said opening;

a lid slidable relative to said pack housing between a closed position closing said opening in light-tight fashion and an open position opening said opening;

a film recovery mouth formed in said pack housing at a trailing end thereof with respect to the direction of sliding said lid toward said open position; and closing means for openably closing said film recovery mouth in light-tight fashion, said closing means comprising a hinged shutter pivoting to open and close said film recovery mouth.

13. A sheet film pack comprising:

a pack housing for receiving a plurality of sheet film units in a stack therein;

an opening formed in a front side of said pack housing for placing a topmost one of said sheet film units in an exposure station through said opening;

a lid slidable relative to said pack housing between a closed position closing said opening in light-tight fashion and an open position opening said opening;

a film recovery mouth formed in said pack housing at a trailing end thereof with respect to the direction of sliding said lid toward said open position;

closing means for openably closing said film recovery mouth in light-tight fashion, said closing means comprising a cap removably attached to said pack housing so as to close said film recovery mouth, said cap catching said lid so as to arrest said lid in said closed position when said cap is attached to said pack housing;

a box-shaped sliding tray for receiving said sheet film pack;

a holder housing in which said sliding tray is slidably mounted;

a cover hinged to said holder housing and pivotally openable for loading said sheet film pack;

an exposure aperture formed in said cover in correspondence with said opening of said sheet film pack loaded in said sliding tray;

an exposure station defined by said exposure aperture, said topmost sheet film unit being disposed in said exposure station and being maintained flat by being pressed by said lid toward said exposure aperture;

first means for releasing said cap of said sheet film pack from said lid as well as from said pack housing; and second means for holding said cap separably from said pack housing in said holder housing, wherein said first and second means are actuated when said cover is closed after loading said sheet film pack.

14. A film pack holder as recited in claim 13, wherein said topmost sheet film unit is positioned in said exposure position by sliding said lid from said closed position to said open position and then from said open position back to said closed position.

15. A film pack holder as recited in claim 14, further comprising a third means for ejecting said topmost sheet film unit after photographing from said sheet film pack, and then inserting said ejected sheet film unit into the bottom of said pack by sliding said sliding tray out of and then back into said holder housing.

16. A film pack holder as recited in claim 15, further comprising a latch mechanism for latching said sliding tray in said holder housing when said lid is in said open position.

17. A film pack holder comprising:
a holder housing having an exposure aperture formed therethrough;
a sliding tray mounted in said holder housing and slidable in a first direction relative to said holder housing, said sliding tray removably holding a sheet film pack having a lid slidable in said first direction so as to place one of a plurality of sheet film units contained in said sheet film pack in an exposure station defined by said exposure aperture and thereafter to press said one of said sheet film units toward said exposure aperture;

a film changing mechanism for ejecting said one of said sheet film units pressed by said lid from said sheet film pack when said sliding tray is drawn out from said holder housing after photographing, and for inserting said ejected sheet film unit back into said sheet film pack on an opposite side of said sheet film pack from said lid when said sliding tray is moved back into said holder housing;

said one of said sheet film units being positioned in an exposure position defined by said exposure aperture by sliding said lid out of said holder housing and then back into said holder housing so as to dispose said lid on top of said holder; and said holder housing further comprising a hinged cover which is pivotally openable to place or remove said sheet film pack into or from said sliding tray.

18. A film pack holder as recited in claim 17, wherein said sliding tray is adapted to be drawn out of said holder housing into a first position for removal of said sheet film pack from said sliding tray for exchanging said sheet film pack.

19. A film pack holder as recited in claim 18, wherein said sheet film pack is diagonally inserted into or removed from said sliding tray in said first position.

* * * * *